Aug. 15, 1961 W. E. LYON 2,996,098
HIGH SPEED TIRE
Filed Dec. 19, 1958 2 Sheets-Sheet 1

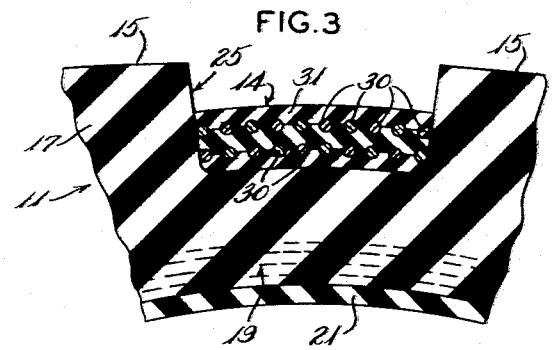
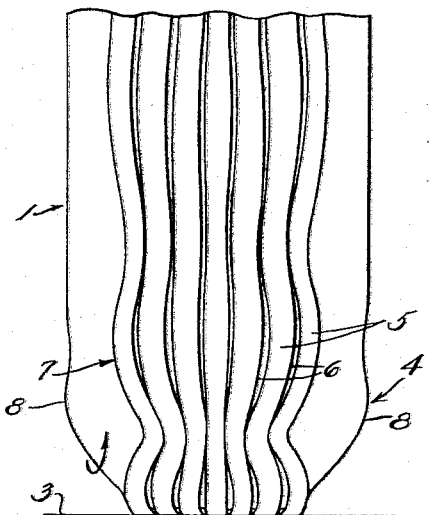
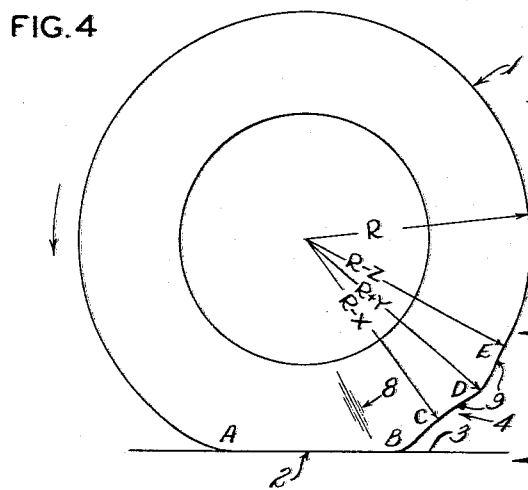
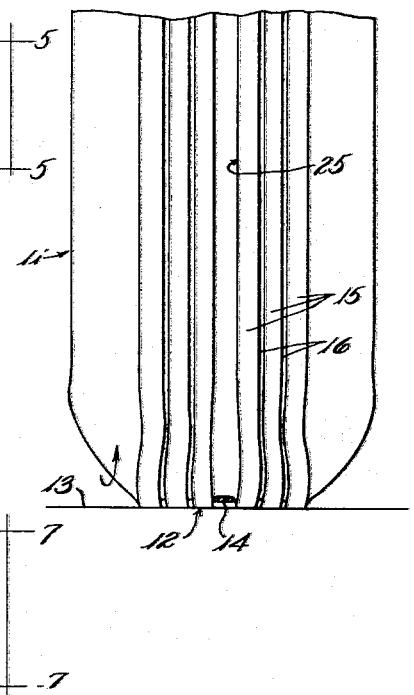
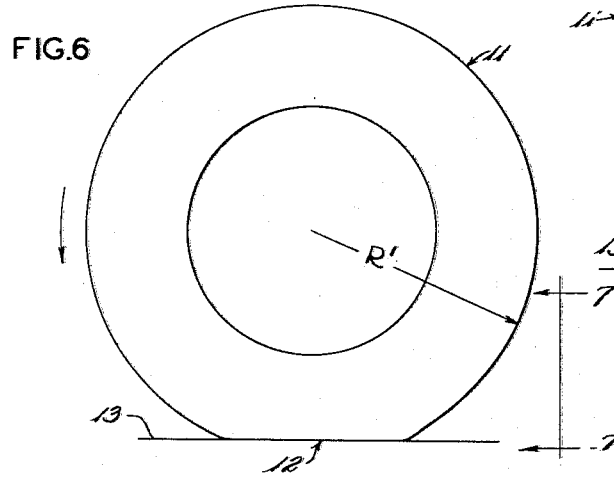

United States Patent Office 2,996,098
Patented Aug. 15, 1961

2,996,098
HIGH SPEED TIRE
Walter E. Lyon, deceased, late of Akron, Ohio, by Doris H. Lyon, executrix, Akron, Ohio, assignor to The Firestone Tire & Rubber Company, Akron, Ohio, a corporation of Ohio
Filed Dec. 19, 1958, Ser. No. 781,685
2 Claims. (Cl. 152—361)

This invention relates to pneumatic tires and is more particularly directed to a tire construction wherein undesirable movement of portions of the tire tread, sidewall and body is prevented by a constricting member extending circumferentially about the tire tread.

As a tire rolls along a road, portions of the tire pass successively through the so-called "footprint" of the tire, the footprint being the flattened area of contact between the tire and the road. The portions, just before they enter the foot-print are following a circular path and are under tension induced by inflation of the tire. As the portions pass through the footprint they follow a straight line dictated by the road surface; once within the footprint, the tire portions are no longer under tension, and they remain free of tension so long as they remain within the footprint. The tire portions, immediately upon leaving the footprint, try to assume the same circular path they had before entering the footprint, and they try to assume the same tension they had before. This resumption of circular form, and of tension, must take place rapidly. The tire, however, is comprised of resilient tread-, sidewall-, and body-portions, and the transition from a flattened, tension-free state to a circular, tensioned state cannot occur smoothly and evenly. Rather, it is attended by a series of violent shocks, resulting in nodes of severe radial and axial distortion in the tire. Just as the tire portions leave the road and again assume tension, the resilient properties of the tire cause these tread portions to retract suddenly radially to a radius smaller than the normal; immediately thereupon, the elastic rebound of the tire causes the tread to snap and become extended radially outwardly to a radius greater than the normal radius. The tread thereupon again retracts radially, although less severely than before, and so on with alternating retractions and extensions, until the action dampens out, and the tire again has returned to a stable rolling radius.

Where the tire tread portion is retracted radially inwardly from the normal diameter, the adjacent portions of the sidewalls bulge axially outwardly; where the tread portion thereafter extends radially beyond the normal position, the sidewalls are pulled axially inwardly.

When a conventional tire is photographed with high-speed equipment camera, it was seen that the nodes of radial and axial distortion in the tread and sidewalls of the tire have the form of standing waves. These waves usually first become visible to the naked eye at speeds approximating 100 miles per hour; they are most severe closely behind the footprint area, and then dampen out as the distance from the footprint area increases. These standing waves are extremely detrimental to the tire, because they place exaggerated demands on the body as well as on the tread and sidewalls of the tire. These rapid radial and axial deformations encourage early tire failure by inducing cracking of the stock in the grooves between the non-skid tread elements; they cause excessive flexing of the tire body, promote separation between the stocks of the tire body and the tread and sidewall, and produce extremely rapid heat build-up.

The present invention is directed to preventing early tire failures such as those mentioned above, by reducing the standing wave behind the contact area of the tire.

This standing wave is minimized by providing an inextensible ring member extending circumferentially about the central portion of the tread of the tire.

The diameter of the inextensible member is such as to effectively constrict the tire a small amount, thereby putting the member in hoop-tension. Held in this manner, the central portion of the tire tread is unable to move extensively either radially outwardly or radially inwardly with respect to the normal diameter of the tire. Thus, no radial distortion is created which can rebound and, consequently, no standing wave is developed in the tread.

As a further result of providing the constricting member of the invention, the violent buckling of the sidewalls is minimized, and the standing wave in the sidewall area of the tire is reduced so as to become practically nonexistent.

It has been suggested in the past that forming the tire body of fabric plies having substantially radially extending cords would combat the formation of a standing wave in the tire tread. It was found, however, that such a construction does not eliminate the standing wave from the tire. While a tire built with radial cords may reduce the amplitude of the wave in the tread, the amplitude and severity of the standing waves in the sidewall are, at the same time, greatly increased.

In the tire construction of the present invention, however, the standing waves in both tread and sidewall are effectively minimized, resulting in a tire capable of safe operation at high, sustained speeds and having a greatly reduced tendency toward early failure due to distortions in the tire.

The object of the present invention is, accordingly, to provide a tire construction which is not susceptible of violent radial and axial deformations under high-speed operation.

Another object is the provision of means for causing the deflected portion of an inflated, rotating tire under load to return to its original configuration rapidly upon leaving the footprint.

A still further object of the invention is to provide a constricting member for a tire which will effectively relieve a substantial portion of the stresses normally carried by the tire tread and body.

Another object of the invention is to provide a constricting member extending circumferentially about the central portion of the tire tread.

A further object of the invention is to provide a tire having an annular circumferential, constricting stress-member located radially outwardly of the body of the tire and radially inwardly of the road-contacting surface of the tire.

Reference is now made to the accompanying drawings, wherein:

FIGURE 3 is an enlarged fragmentary sectional view of the tire of the invention, with the constricting band in place.

FIGURE 4 is a diagrammatic side elevation of a conventional tire, rotating at high speed and under load, as observed with a high-speed camera.

FIGURE 5 is an enlarged fragmentary, diagrammatic view of the conventional tire of FIG. 4, as viewed by a high-speed camera, along the line 5—5 thereof.

FIGURE 6 is a diagrammatic side elevation of a tire according to the invention, rotating at high speed and under load, as observed by a high-speed camera.

FIGURE 7 is an enlarged, fragmentary diagrammatic view of the tire of FIG. 6 as viewed along line 7—7 thereof, by a high-speed camera.

Figure 1:
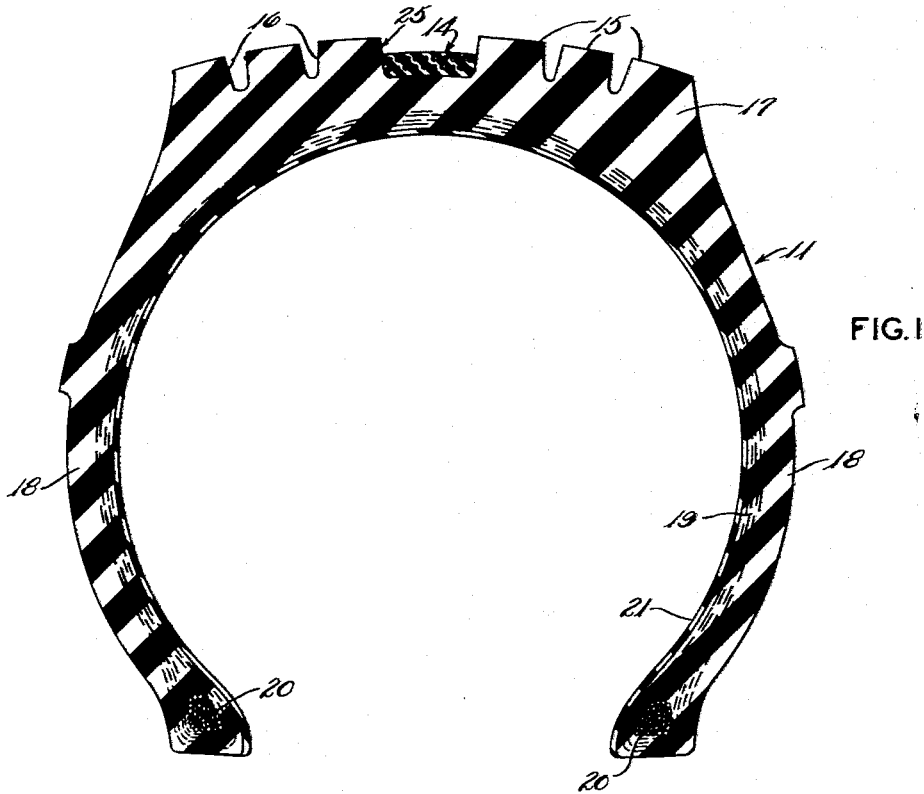
FIGURE 1 is a sectional view of a tire, provided with the constricting band of the invention.

Referring to the drawings, FIGURES 4 and 5 show diagrammatically the action of a conventional tire 1, rotating at high speed in the direction of the arrow and having a footprint portion 2 deflected under load and in contact with a road surface 3.

Immediately before the tire portions enter the footprint 2, the conventional tire 1 of FIG. 4 is under tension induced by inflation, and has a rolling radius of R. As the tire portions pass into the footprint at A, they are relieved of tension, and the portions remain free of tension until they again leave the footprint 2 at B. Immediately after leaving the footprint, the tire portions again try to revert to their original tension and their original circular pattern of travel. That is, the tire attempts to return to the normal rolling radius R it had before entering the footprint at A. This return to normalcy, however, is attended by a series of violent radial and axial distortions, indicated generally at 4, which distortions are a result of the tire's resilient properties and its attendant tendency to "hunt" for its original rolling radius when released from the footprint.

Thus, as the tire portion leaves the fotprint area 2 at B and is again put under tension, the tire reacts violently due to this resilient characteristic, and the tire tread is consequently retracted axially at point C, a distance X less than the normal rolling radius R, making the distance from the center of the wheel to the radially outer surface of the tire tread at this point R−X. Immediately thereafter, at point D, the rebound characteristics of the tire cause the tread portion to become extended radially a distance Y beyond the normal rolling radius R, making the distance from the wheel center to the radial outer surface of the tread at this point R+Y. The tread is thereupon again retracted at E, to a distance R−Z from the wheel center. Alternating radial extensions and retractions, indicated generally at 9 and continuing with diminishing magnitude, continue until the tire has again attained its original running radius R.

The tread of the conventional tire 1 is provided with generally parallel, circumferentially extending non-skid ribs 5, separated by grooves. For purposes of clarity and simplicity, the ribs and grooves are here shown straight. While the tire tread thus distorts radially as at 9, the sidewalls buckle axially and in a wavy manner as at 8; the ribs 5 no longer remain circumferential but take a wavy path 7 thus becoming alternately widely spaced and contiguous.

The violent radial distortions 9, the axial buckling 8, and the wave shape 7 set up in the tread, all contribute to early tire failure from separation between the rubber stocks; flexing; rapidly heat build-up, and physical tearing of the tire components.

The tire 11 of the invention is best seen in FIGURE 1, and is of generally conventional construction, having a generally circular cross section, and comprising a rubbery tread portion 17 with non-skid ribs 15 separated by grooves 16. The tread portion 17 and merging rubbery sidewall portions 18 overlie the tire body portion 19 terminating in substantially inextensible bead portions 20.

The tire depicted is particularly adapted for use as a tubeless tire, and its inner periphery is accordingly covered with a substantially air-impervious layer 21.

Figure 2:
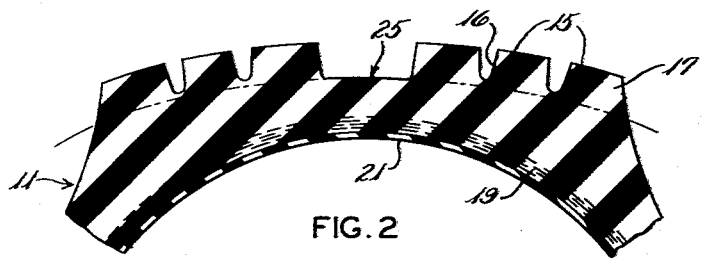
FIGURE 2 is a fragmentary sectional view of the tire of FIG. 1 without the constricting band.

According to the invention, the tire is provided with an annular constricting member 14, which is located in a circumferentially extending cavity 25 in the central crown area of the tread 17. The bottom of the cavity 25 lies inwardly of the road-contacting surface of the tread, and is located at or near the level of the bottom of the grooves 16, as indicated by the dot-dash line in FIGURE 2. The thickness of the constricting member is such that its radially outer surface remains out of contact with the road under all conditions of inflation, speed of rotation, and load.

A useful constricting member 14 would have a width of between approximately 10% and 60% of the arc width of the tire tread. A width of between about 15% and 40% of the arc length is preferred, the example to be described hereinafter having utilized, specifically, a band width of about 16%.

The inner diameter of the constricting member 14 is such that when the tire is in operation, a substantial portion of the forces imparted to the tire by inflation, speed of rotation, and load is resisted by hoop tension in the constricting member. It was found that an effective structure is produced by choosing the diameter of the band 14 so as to constrict the diameter of the cavity 25 a small amount when the tire is inflated, although this reduction in diameter should not be sufficient to distort the circular cross section of the tire a substantial amount.

As will be seen particularly from FIGURE 3, the constricting member 14 comprises one or more layers of strain members 30 embedded in a rubbery substance 31. It was found that a very effective constricting member may be from plies produced by winding continuous twisted wire-cord 30 into generally parallel convolutions and surrounding the wire with a rubbery substance 31. Vulcanization firmly unites the wires 30, the rubbery substance 31 and the tire 11 into a unit.

A successful, representative assembly was made, comprising an 8.00–15 tire with a constricting member, and produced as follows:

Two bands or plies, each comprising 10 helical turns of 7 x 3, .039" gauge steel wire-cord, were wound one upon the other, the cord being insulated on all sides with an unvulcanized rubber compound; this resulted in a constricting member approximately .75" wide, which was then vulcanized into the tire so as to constrict the diameter of the cavity 25 approximately .7".

The constricting member 14 may also be made by utilizing the characteristic of certain materials under tension to stretch a relatively great amount from their original length, and thereafter to remain substantially inextensible.

It will be noted that the constricting member 14 may be comprised of one or more layers, depending on the characteristics desired and the strength and extensibility of the material used. Thus, any material may be used which is capable of maintaining, under inflation, speed and load, a diameter enabling the member to effectively constrict the tire and to relieve a substantial portion of the stresses normally resisted by the tread and body portions of the tire.

In place of the twisted wire cords shown, other cord materials, single or twisted, may be used, as well as annular bands or tapes of suitably strong materials.

FIGURES 6 and 7 show diagrammatically the action of the tire 11, constructed in accordance with the invention, and rotating at high speed in the direction of the arrow; the tire is deflected in contact with the road surface 13 in a footprint 12. Since the tire is effectively constricted radially by the inextensible member 14 seated in the cavity 25, the central portion of the tread is unable to undertake the violent excursions experienced with conventional tires. The inextensible member preventing any initial local tread displacement, no resilient rebound can occur. Thus, as the tire portions pass out of the footprint area 12, in which they were free of tension, they are again subjected to tension, but now the tire almost immediately resumes its original circular path and normal rolling radius R'. It will be seen that the standing wave in the tire tread has thus been effectively reduced.

As shown in FIGURE 7, the tire of the invention is also provided with non-skid tread ribs 15, separated by grooves 16. Unlike the conventional tire 1, however, the present tire 11 does not exhibit any violent axial sidewall distortions, and the elements of the tread maintain a substantially uniform, circumferential path.

The standing tread and sidewall waves so detrimental to the life of conventional tires have been so reduced by the tire construction of the invention, that the dangers of early tire failure from excessive flexing of the body, separation between the tire components, cracking and rapid heat build-up are minimized.

While a preferred form of the invention has been described, various changes will be apparent to those skilled in the art without departing from the scope of the invention, the essential features of which are summarized in the appended claims.

What is claimed is:

1. A pneumatic tire having in the inflated condition a body portion generally circular in cross section, and a tread integral therewith and comprising a road-engaging surface provided with anti-skid grooves, said tread having a continuous, outwardly opening, circumferentially extending cavity in the central crown portion thereof, and an annular, flexible, inextensible member in said cavity, the inner diameter of said member being slightly smaller than the normal diameter of the base of said cavity, the base of said cavity being located near the level of the bottom of said grooves, whereby said member is located radially outwardly of every portion of said circular tire body portion.

2. A pneumatic tire as in claim 1, wherein the outer surface of said member lies radially inwardly of every portion of said road-engaging surface.

References Cited in the file of this patent

UNITED STATES PATENTS

| | | |
|---|---|---|
| 922,631 | Reddaway | May 25, 1909 |
| 956,928 | Bonnet | May 3, 1910 |
| 1,293,528 | Palmer | Feb. 4, 1919 |
| 2,691,335 | Murray | Oct. 12, 1954 |
| 2,703,517 | Hooper | Mar. 8, 1955 |
| 2,874,742 | Lugli | Feb. 24, 1959 |